(12) United States Patent
Sakurai

(10) Patent No.: US 9,928,616 B2
(45) Date of Patent: Mar. 27, 2018

(54) INFORMATION PROCESSING APPARATUS, INFORMATION PROCESSING SYSTEM, CONTROL METHOD FOR INFORMATION PROCESSING APPARATUS, AND STORAGE MEDIUM

(71) Applicant: CANON KABUSHIKI KAISHA, Tokyo (JP)

(72) Inventor: Masakatsu Sakurai, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 14/879,321

(22) Filed: Oct. 9, 2015

(65) Prior Publication Data

US 2016/0104300 A1 Apr. 14, 2016

(30) Foreign Application Priority Data

Oct. 14, 2014 (JP) ................. 2014-210160

(51) Int. Cl.
*G06K 9/00* (2006.01)
*G06T 9/20* (2006.01)
*G06T 9/00* (2006.01)

(52) U.S. Cl.
CPC . *G06T 9/20* (2013.01); *G06T 9/00* (2013.01)

(58) Field of Classification Search
CPC ... G06T 9/00; G06T 9/20; G06T 11/60; G06T 11/20; G06T 3/40; G06T 3/403; G06T 7/149; G06T 7/60
See application file for complete search history.

(56) References Cited

U.S. PATENT DOCUMENTS

| 2009/0141038 A1* | 6/2009 | Newaskar | G06T 11/203 345/589 |
| 2009/0297064 A1* | 12/2009 | Koziol | G06T 11/203 382/302 |
| 2013/0120426 A1* | 5/2013 | DiVerdi | G06T 11/001 345/589 |

FOREIGN PATENT DOCUMENTS

| JP | H0210476 A | 1/1990 |
| JP | H09205539 A | 8/1997 |

* cited by examiner

*Primary Examiner* — Yon Couso
(74) *Attorney, Agent, or Firm* — Carter, Deluca, Farrell & Schmidt, LLP

(57) ABSTRACT

A data conversion server reduces a data amount of a path that constitutes drawing data. The data conversion server adds information used to adjust a scale of the drawing data to the drawing data, wherein the information is obtained based on a length of the path before the data amount is reduced. For example, in a case of data in the SVG format, path length information before the data amount is reduced is set to an attribute (pathLength) as the information used to adjust the scale.

15 Claims, 15 Drawing Sheets

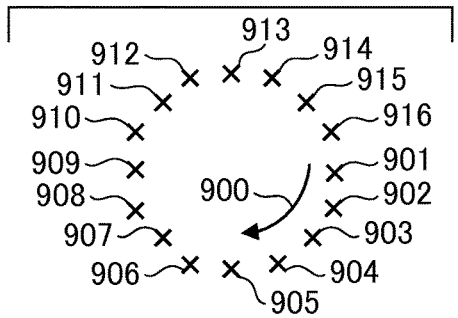
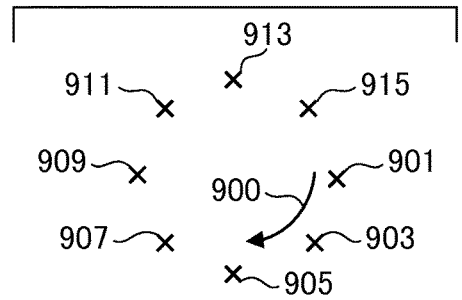
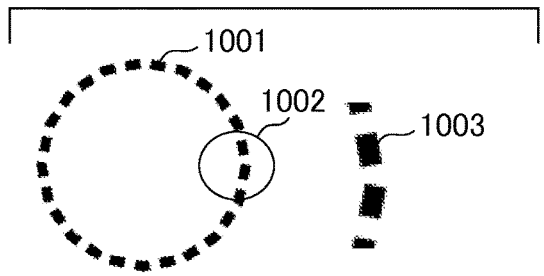
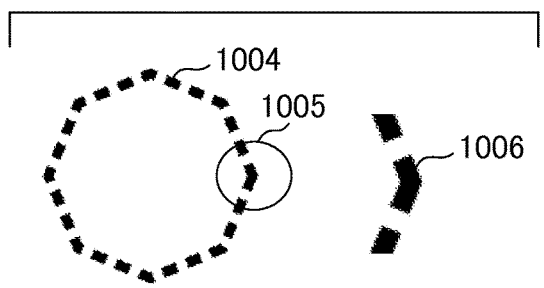
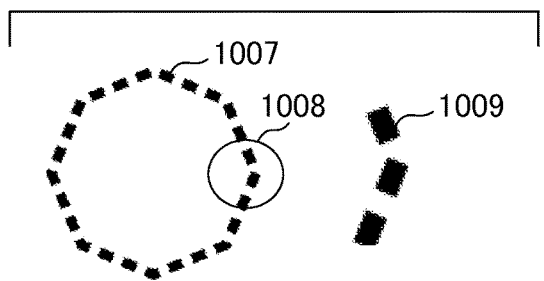

FIG. 15

```
<?xml version="1.0" encoding="UTF-8" standalone="no"?>
<!DOCTYPE svg PUBLIC "-//W3C//DTD SVG 1.1//EN" "http://www.w3.org/Graphics/SVG/1.1/DTD/svg11.dtd">
<svg width="12cm" height="8cm" viewBox="0 0 1200 800" xmlns="http://www.w3.org/2000/svg" version="1.1">
  <polygon fill="none" stroke="black" stroke-width="10" stroke-dasharray="14,7,9,8"
    points="300,600 270.7,670.7 200,700 129.3,670.7
    100,600 129.3,529.3 200,500 270.7,529.3 z"/>
</svg>
```

1502 — CORRECT DASH PATTERN

INFORMATION PROCESSING APPARATUS, INFORMATION PROCESSING SYSTEM, CONTROL METHOD FOR INFORMATION PROCESSING APPARATUS, AND STORAGE MEDIUM

BACKGROUND OF THE INVENTION

Field of the Invention

The present invention relates to an information processing apparatus, an information processing system, a control method for an information processing apparatus, and a storage medium.

Description of the Related Art

A File in SVG (Scalable Vector Graphics) format is described by XML (Extensible Markup Language) format and can be displayed in a standard web viewer. Thus, SVG format is suitable for use in a mobile terminal having the web viewer as a standard. Therefore, PDF (Portable document format) files or Microsoft Word files and the like are often used by temporally converting them to SVG format, which can be displayed to any mobile terminals. However, compared to a PC terminal, a mobile terminal has limitations such as a small memory, a weak CPU, small screen display, low speed communication and the like.

Furthermore, a file to be displayed is not stored in the mobile terminal, but often stored in an external server such as the cloud, and for acquiring the file, preferably the size of a SVG file is small as possible. Accordingly, since the screen size is relatively small, for a complicated figure, the mobile terminal sometimes thin a part of points of a coordinate point sequence expressing the figure up to the level at which the appearance is not changed. Hereinafter, a coordinate point sequence from a start point to an end point, which is representing a figure, is referred to as path, and thinning out the points of a part of the path is referred to as path thinning. Note that a coordinate point sequence that configures a path may include a control point which indicates a curve.

Japanese Patent Laid-Open No. H9-205539 and Japanese Patent Laid-Open No. H2-10476 disclose an image processing apparatus that reduces file size and the load of the figure drawing processing. Japanese Patent Laid-Open No. H9-205539 discloses an image processing apparatus that converts figure data representing a polygon in which a path is defined by 3 or more regulation points to figure data representing a simple polygon that has fewer specified points than the figure. Also, Japanese Patent Laid-Open No. H2-10476 discloses a polygonal line approximation apparatus for a curve that changes the number of polygonal lines that is approximated according to a curvature of the curve, and approximates the curve to a polygonal line.

However, Japanese Patent Laid-Open No. H9-205539 and Japanese Patent Laid-Open No. H2-10476, do not consider that difference in drawing results may occur due a change in the length of a path, when a data amount of the path in drawing data is reduced and, for example, complex drawing is performed such as a line drawing of a path, a character string drawing along a path, or the like. Note that a length of a path is a sum (total distance) of distances between a coordinate point sequence from a start point to an end point representing a figure, and hereinafter, this is called a path length. As an example of the difference between the drawing results, there are changes in the appearance of a dash pattern upon a line drawing, changes in a number of character that can be drawn in the path on a character string drawing, and the like, where a description will be given with reference to FIGS. 10A to 10C and FIGS. 12A to 12C.

SUMMARY OF THE INVENTION

The present invention provides an information processing apparatus that enables suppressing the deterioration in drawing quality while reducing a data amount of drawing data.

According to an aspect of the present invention, an information processing apparatus includes: a reducing unit configured to reduce a data amount of a path that constitutes drawing data; an adjusting unit to add information used to adjust a scale of the drawing data to the drawing data, wherein the information is obtained based on a length of the path before the data amount is reduced.

According to the information processing apparatus of the present invention, deterioration in drawing quality can be suppressed while reducing a data amount of drawing data. Accordingly, while shortening data communication time or speeding up display time, a deterioration in drawing quality can be suppressed.

Further features of the present invention will become apparent from the following description of exemplary embodiments with reference to the attached drawings.

BRIEF DESCRIPTION OF THE DRAWINGS

FIGS. 9A and 9B are diagrams illustrating an example of a path before thinning out and after thinning out.

FIGS. 10A to 10C are diagrams illustrating a dash pattern drawing of a path before thinning out and a path after thinning out.

FIG. 15 is a diagram illustrating an example of SVG format data.

DESCRIPTION OF THE EMBODIMENTS

Hereinafter, embodiments of the present invention will be described with reference to the drawings.

First Embodiment

Figure 1:
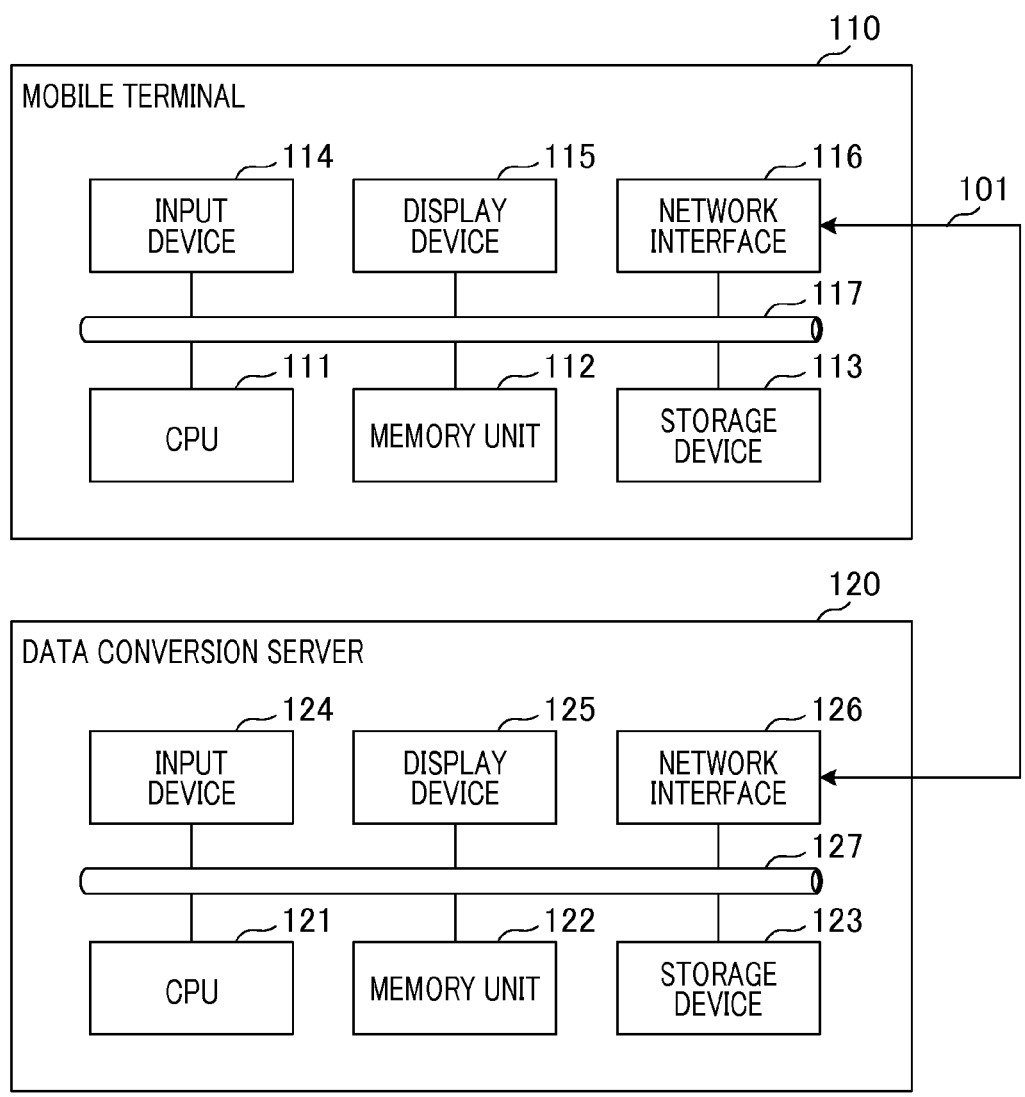
FIG. 1 is a diagram illustrating an exemplary hardware configuration of an information processing system according to a first embodiment.

FIG. 1 is a diagram illustrating an exemplary hardware configuration of an information processing system according to the present embodiment.

The information processing system according to the present embodiment is an exemplary system that converts page description data such as PDF, Word, or the like to SVG data. The information processing system shown in FIG. 1 is constituted by a combination of a mobile terminal 110 such as a smartphone or a tablet, a data conversion server (image processing apparatus) 120, and a network 101 for connecting these elements. The network 101 is, for example, a LAN, a WAN, or the like, where "LAN" is an abbreviation for "Local Area Network" and "WAN" is an abbreviation for "Wide Area Network".

The mobile terminal 110 includes a CPU 111, a memory unit 112, a storage device 113, an input device 114, a display device 115, and a network interface 116, where "CPU" is an abbreviation for "Central Processing Unit". The CPU 111 controls the entire mobile terminal 110. The network interface 116 can connect the mobile terminal 110 to other devices via the network 101. The memory unit 112 is constituted by, for example, a semiconductor random access memory (RAM) and a read only memory (ROM), where "RAM" is an abbreviation for "Random Access Memory" and "ROM" is an abbreviation for "Read Only Memory".

The storage device 113 typically includes a hard disk drive or a flash memory, and is used for storing an OS, programs and data, where "OS" is an abbreviation for "Operating System".

The mobile terminal 110 includes the input device 114 such as a touch panel, a keyboard, a microphone for voice input, or the like and the display device 115 for performing display. The mobile terminal 110 uses the components 111 to 116 of the mobile terminal 110 that performs communication via an OS, such as iOS of the Apple's iOS, Google's Android, LINUX, or Microsoft's Windows, and a mutual connection bus 117.

Software for realizing operation processing performed by the mobile terminal of the present embodiment is, stored for example, in a computer readable medium including the aforementioned storage device. The software is loaded into a computer from a computer readable medium and is then executed by the CPU 111 of the mobile terminal 110. The use of the computer program product by the computer can be operated as a device that is advantageous for image processing.

The data conversion server 120 includes a CPU 121, a memory unit 122, a storage device 123, an input device 124, a display device 125, and a network interface 126. The CPU 121 controls the entire data conversion server 120. The network interface 126 can connect the data conversion server 120 to other devices via the network 101. The memory unit 122 is constituted by, for example, a semiconductor random access memory (RAM) and a read only memory (ROM).

The storage device 123 typically includes a hard disk drive or a flash memory and is used for storing an OS, programs, and data. The data conversion server 120 includes the input device 124 such as a keyboard, a mouse, or the like, and the display device 125 for performing display. The data conversion server 120 uses the components 121 to 126 of the data conversion server 120 that performs communication via an OS, such as LINUX, Microsoft's Windows and the like, and a mutual connection bus 127.

Software for realizing operation processing performed by the data conversion server 120 of the present embodiment is stored, for example, in a computer readable medium including the aforementioned storage device. The software is loaded into a computer from a computer readable medium and is then executed by the CPU 121 of the data conversion server 120. The use of the computer program product by the computer can be operated as a device that is advantageous for data conversion processing.

Figure 2:
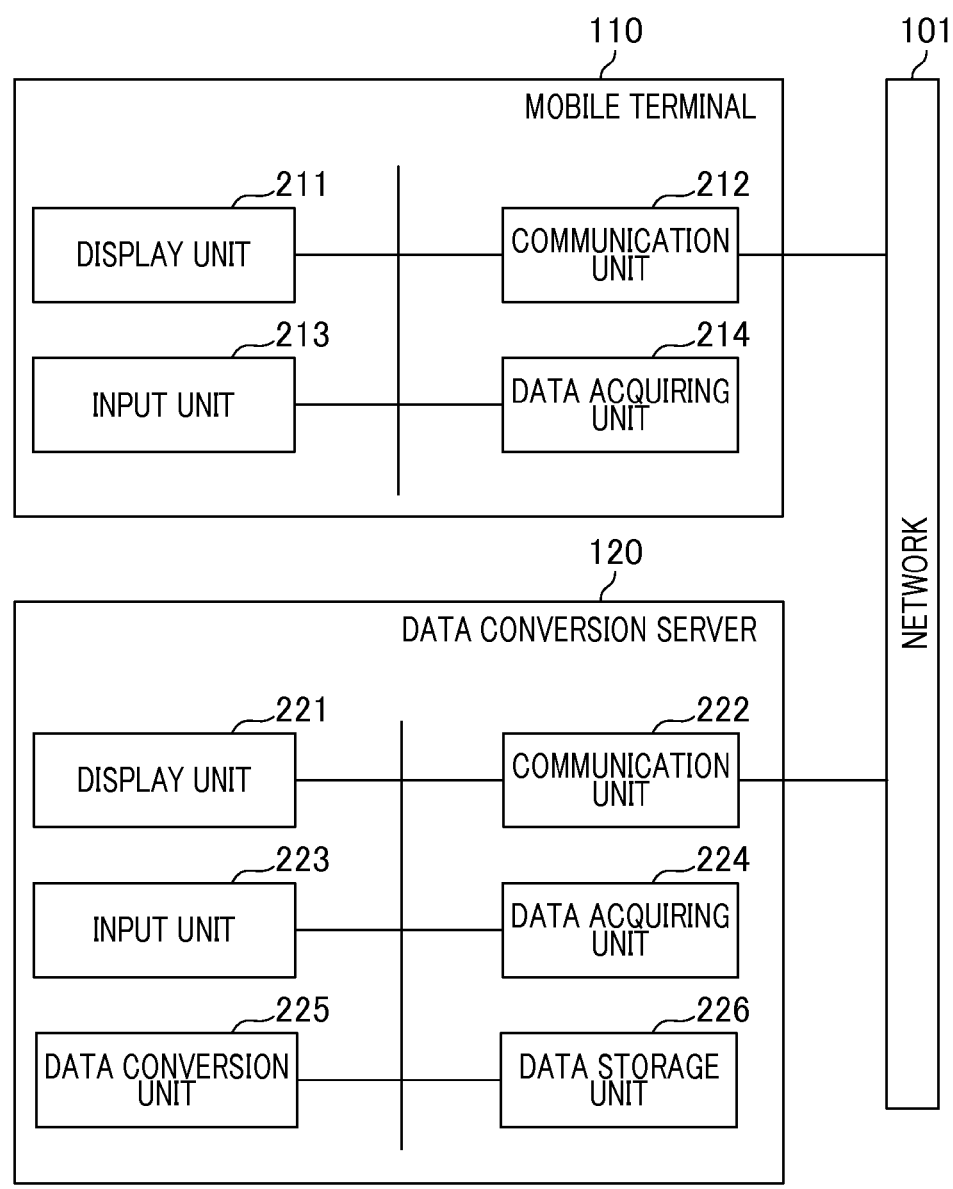
FIG. 2 is a diagram illustrating an exemplary function configuration of the information processing system according to the first embodiment.

FIG. 2 is a diagram illustrating an exemplary function configuration of the information processing system according to the present embodiment.

In the information processing system according to the present embodiment, data which have received a data conversion instruction by the mobile terminal 110 is transmitted to the data conversion server 120. The data conversion server 120 performs data conversion processing, which is converting data to specified format, transmits the generated data to the mobile terminal 110, and the mobile terminal 110 performs terminal display. As shown in FIG. 2, the mobile terminal 110 and the data conversion server 120 communicate with each other via the network 101. The network 101 is, for example, the Internet, an Intranet, or the like.

The mobile terminal 110 includes a display unit 211, a communication unit 212, an input unit 213, and a data acquiring unit 214. The display unit 211 performs terminal display. The communication unit 212 is connected to the network 101 so as to perform network communication with other devices. The input unit 213 inputs an instruction to an application and a print instruction in accordance with a user operation. The data acquiring unit 214 acquires document data and data for an application to operate.

The data conversion server 120 is provided with a display unit 221, a communication unit 222, an input unit 223, a data acquiring unit 224, a data conversion unit 225, and a data storage unit 226. The display unit 221 performs terminal display. The communication unit 222 is connected to the network 101 so as to perform network communication with other devices. The input unit 223 inputs data and an instruction in accordance with a user operation. The data acquiring unit 224 acquires data to be converted. The data conversion unit 225 performs data conversion for converting input data into a specified format. The processes in flowcharts described below by using FIG. 3 to FIG. 8 and FIG. 14 are performed by the data conversion unit 225. The data storage unit 226 stores data during data conversion processing.

Figure 3:
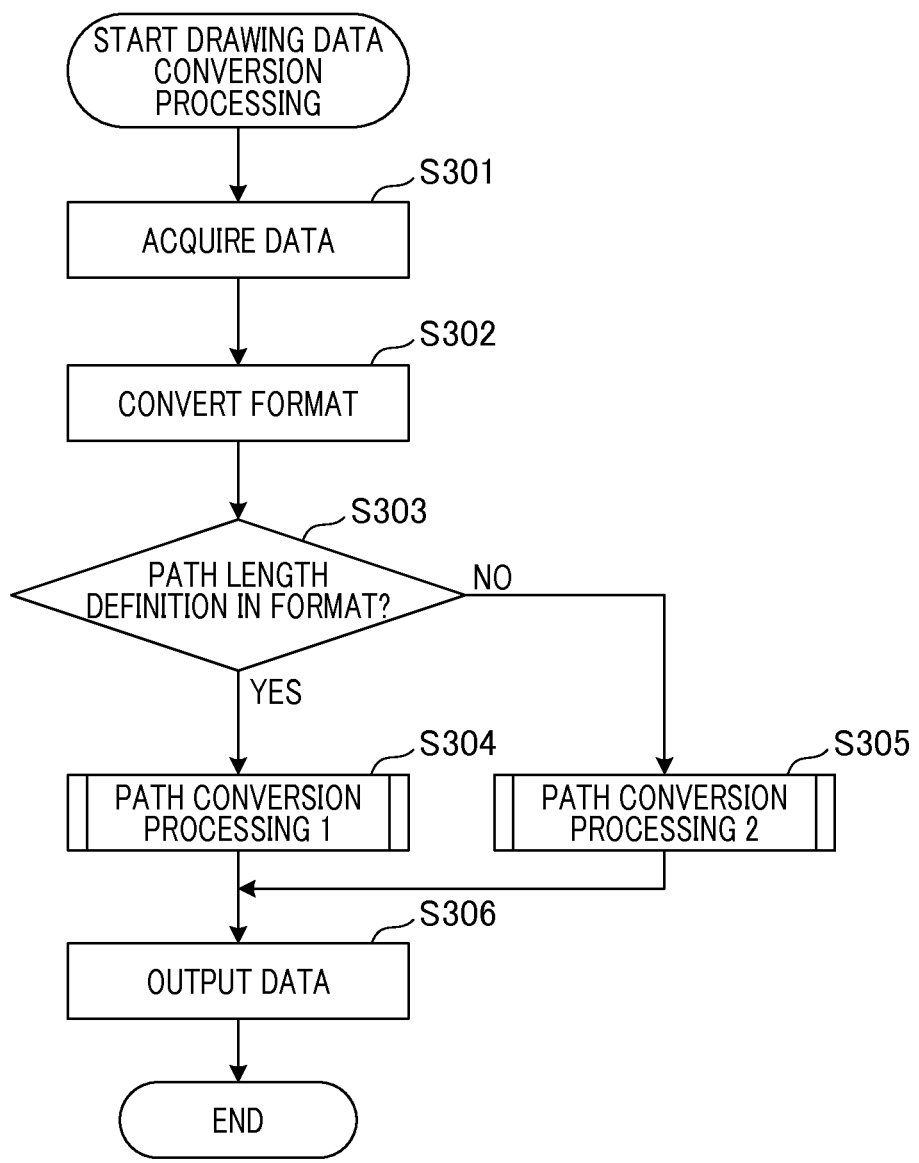
FIG. 3 is a main flowchart illustrating a drawing data conversion processing.

FIG. 3 is a main flowchart illustrating drawing data conversion processing, which is processing to convert page description data such as PDF, Word, or the like to SVG data on the data conversion server, according to the present embodiment. In the processing flow of the entire information processing system according to the present embodiment, firstly, the mobile terminal 110 transmits data to be converted and data including conversion format information to the data conversion server 120. In the data conversion server 120, processing of the data conversion unit, which is stored in the storage device 123, is loaded into the memory unit 122 and executed by the CPU 121. The CPU 121 performs the processing of the flowcharts described below in FIG. 3 to FIG. 8 and FIG. 14 by controlling the memory unit 122, the storage device 123, the input device 124, the display device 125, and the network interface 126. The data conversion server 120 transmits converted and generated data to the mobile terminal 110.

The CPU 111 controls the memory unit 122, the storage device 123, the input device 124, the display device 125, and the network interface 126, so that the mobile terminal 110 performs terminal display of received data on the display device 115. The description above is the basic flow of the drawing data conversion processing of the information processing system according to the present embodiment. The details of the drawing data conversion processing will be described below with reference to FIG. 3.

Firstly, when the processing of the data conversion unit 225 is loaded and executed by the CPU 121, in S301, the CPU 121 controls the network interface 126 so that the communication unit 222 acquires data to be converted. Next, in S302, the CPU 121 performs format conversion of the acquired data into specified data format. The format conversion described here is simply converting input data into specified format and optimizing a path or the like is not performed.

Next, in S303, the CPU 121 determines whether or not the specified format is a format that is able to specify a path length. For example, in SVG format, path length (pathLength) is defined as a distance along the path. In a case that drawing data is assumed to be strictly calculated and drawn according to path coordinates representing a figure, the figure may not been drawn as expected if a calculation error of the path length occurs upon drawing the figure. To solve this problem, in some formats, the path length is defined, and for a path for which the path length is set, a path length found by being actually calculating is corrected by the set value as the path length. For example, when the calculated path length is 90 and the set path length is 100, a drawing correction is performed by a ratio of 90/100.

If the determination of S303 is YES, the processing, which will be described below with reference to FIG. 4, proceeds to S304 and path conversion processing 1 is performed. Then in S306, the CPU 121 outputs the converted data to the mobile terminal 110 by the communication unit 222 and ends the drawing data conversion processing. In contrast, if the determination of S303 is NO, the processing, which is described below with reference to FIG. 14, proceeds to S305 and the CPU 121 performs path conversion processing 2 and proceeds to S306.

Figure 4:
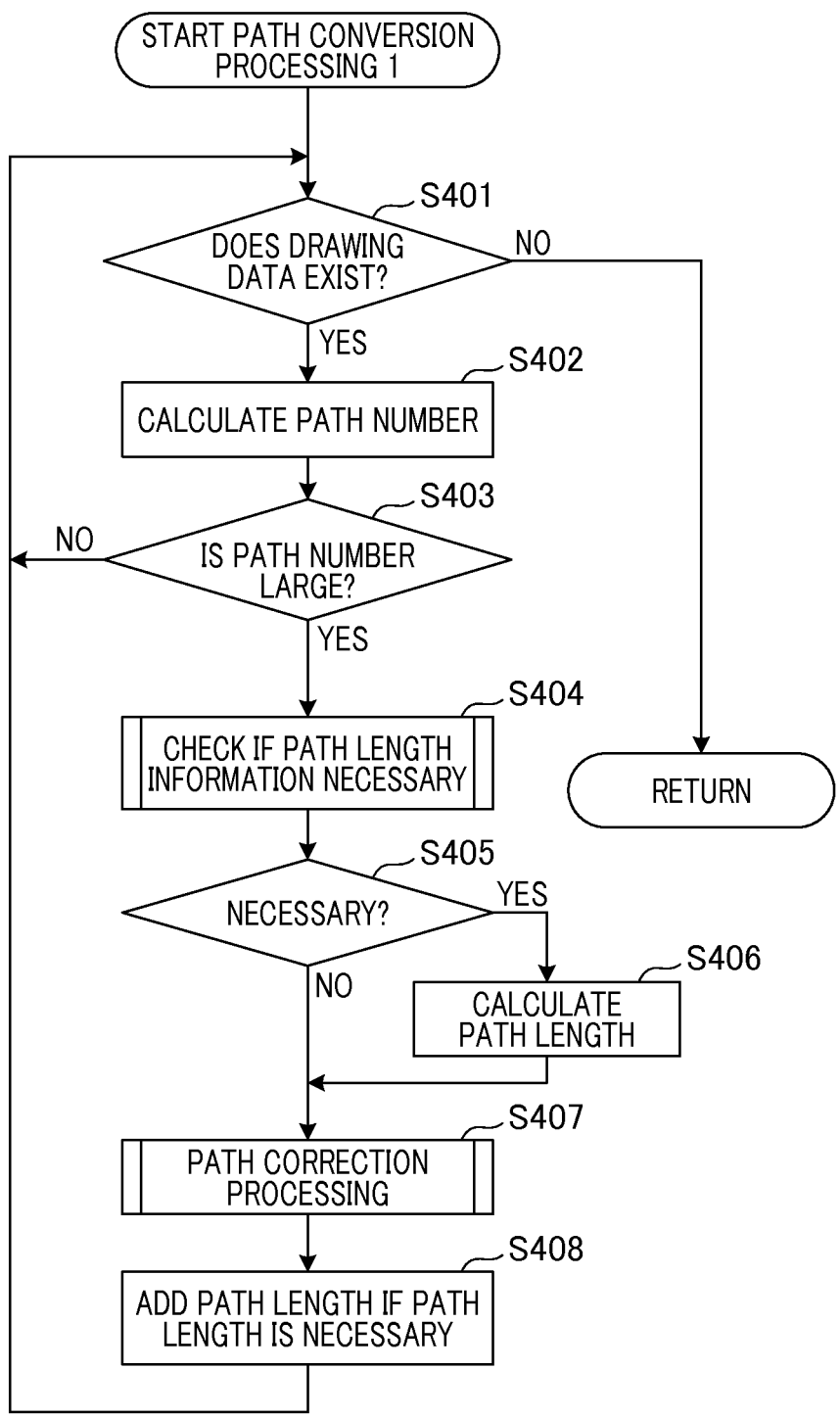
FIG. 4 is a flowchart illustrating a path conversion processing 1.

FIG. 4 is a flowchart illustrating the path conversion processing 1 called in S304 shown in FIG. 3.

Firstly, when the processing of the data conversion unit 225 is loaded and executed by the CPU 121, in S401, the CPU 121 determines whether or not unprocessed drawing data exists. If unprocessed drawing data exists, the processing proceeds to S402, and if unprocessed drawing data does not exist, the processing returns to the calling process.

In S402, the CPU 121 calculates a number of coordinate points in the path of the drawing data. Hereinafter, the number of coordinate points in the path is called "path number". Also, a unit of the drawing data here is data related to one figure drawing and it includes a definition of path, a drawing specification for the path, and a drawing attribute. For example, FIG. 13 illustrates an example of SVG format data and data surrounded by a frame 1300 corresponds to one unit of the drawing data. In this way, in the case of the SVG format, each element of a unit of the drawing data such as a figure or the like is described by using a specific tag respectively inside a svg tag. The elements surrounded by the frame 1300 are data for drawing a polygon by a "polygon" tag and the data includes data for defining a path, which is enclosed by a frame 1302 and data for specifying drawing attributes other than defining the path. More specifically, as the data enclosed by the frame 1302, to define a path (a coordinate point sequence from start point to end point representing a figure), "points" attribute is used and, values of an X coordinate and a Y coordinate of each coordinate point are separated by a comma or a space. Furthermore, for an example as the drawing attributes, in regards to drawing a polygon, "fill", "stroke", "strokewidth", and "stroke-dasharray" are used to specify a paint color or a color for a border line, a width of the border line, making dash line or not, or the like.

Figure 5:
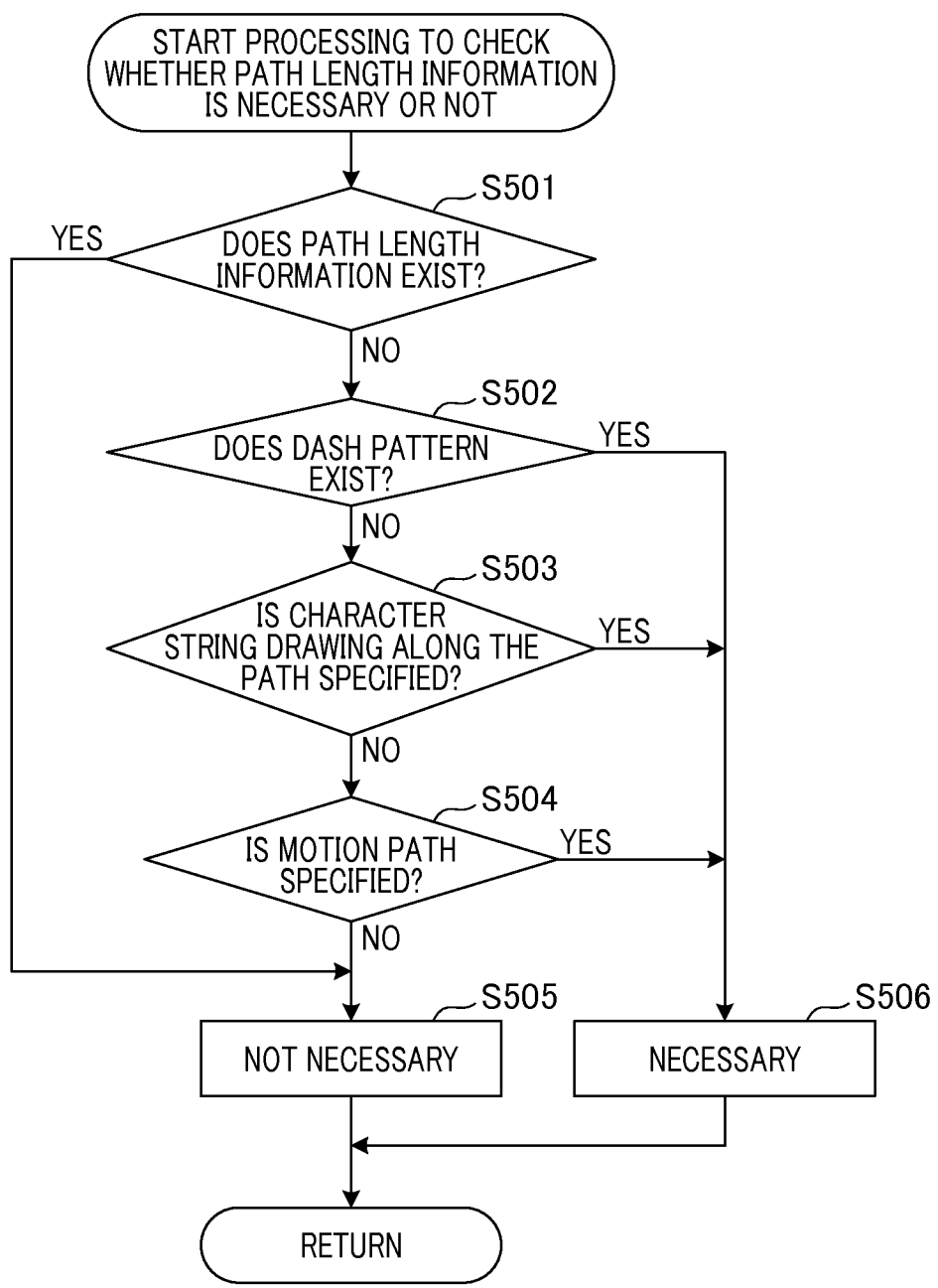
FIG. 5 is a flowchart illustrating a check processing to check that path length information is necessary or not.

In S403, the CPU 121 determines whether or not the path number is larger than a predetermined value. If the path number is not larger than the predetermined value, the processing returns to S401, and if the path number is larger than the predetermined value, the processing proceeds to S404. In a case where processing power of the device to be displayed is high or speed of data communication is high, even if the path number is large, there are few cases in which processing time of the system becomes a problem. Thus, the predetermined value is set to a large value. In contrast, in a case where processing power of the device to be displayed is low or speed of data communication is low, the processing time of the system caused by the path number being large becomes a problem. Thus, the predetermined value is preferably set to a small value. In the present embodiment, as an example, it is determined whether or not that the path number is over 100. Since the correction processing for the path has small effects when the path number is small, the above determination is performed. In S404, check processing to check whether path length information is necessary or not, which will be described below with reference to FIG. 5, is performed.

In S405, the CPU 121 determines whether or not the path length information is necessary. If it is determined that the path length information is necessary, the processing proceeds to S406, and the calculation of the path length is performed and proceeds to S407. In contrast, if it is determined that the path length is not necessary, the processing proceeds to S407.

Figure 11A:
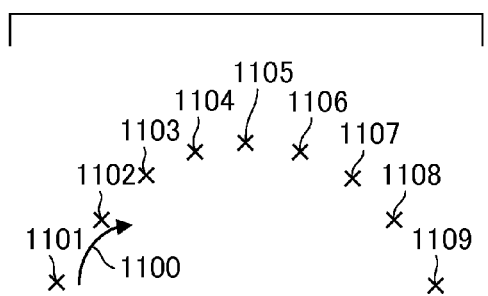
FIGS. 11A and 11B are diagrams illustrating an example of a path before thinning out and after thinning out.

The calculation of the path length is performed by sequentially extracting values of the path coordinates from the start point to the end point, obtaining distances between two points, and accumulating them. FIGS. 9A and 11A are diagrams illustrating examples of a path before the path correction processing. In FIG. 9A, a distance of a path expressed by 17 points, which starts from a start point 901, continues in the direction of an arrow 900 to a point 902 and a point 903 until an end point 901, is obtained as the path length. Also in FIG. 11A, a distance of a path expressed by 9 points, which starts from a start point 1101 to an end point 1109 in the direction of an arrow 1100, is obtained as the path length. It is not shown, but if there is a curve along the path, the distance of the path is obtained based on the definition of the curve. For example, if the curve is Bezier curve, the distance is obtained according to the definition of the Bezier curve.

In S407, the CPU 121 performs path correction processing 1 to 3, which will be described below with reference to FIG. 6 to FIG. 8. Which one of the correction processing is performed among the path correction processing 1 to 3 can be determined to perform the predetermined correction processing or can be combined a plurality of the correction processing. The data amount of the drawing data shown by the path can be reduced by either correction processing. The state in which the data amount of the drawing data is reduced by the correction processing will be described below. Next, in S408, if it is determined that the path length is necessary in S405, the CPU 121 performs processing to add the path length information obtained based on the calculated path length in S406 to the data and the processing returns to S401. In other words, in S408, the CPU 121 adds the path length information based on the length of the path before the path correction processing to the data. The additional processing of the path length information will be described below.

Figure 13A:
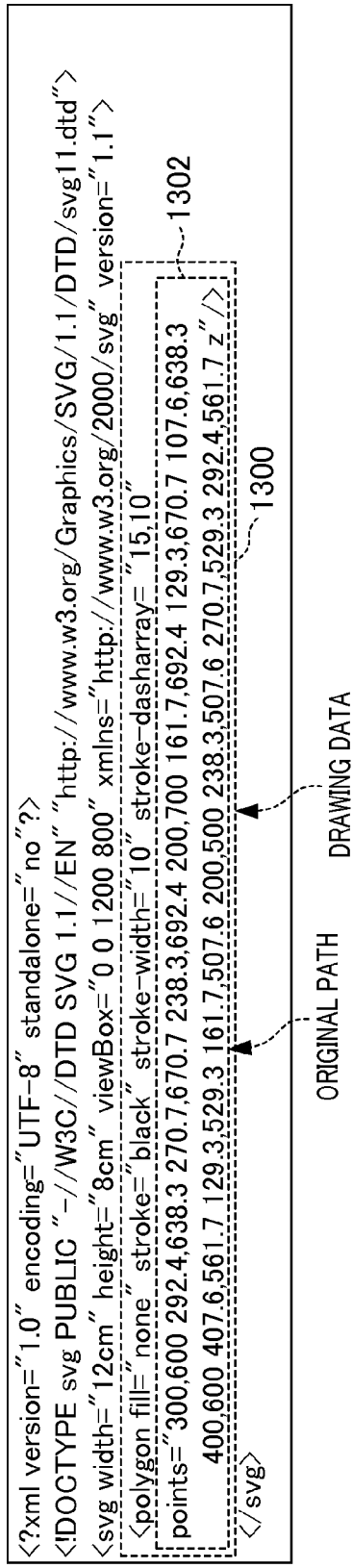
FIGS. 13A to 13C are diagrams illustrating an example of SVG format data.
Figure 13B:
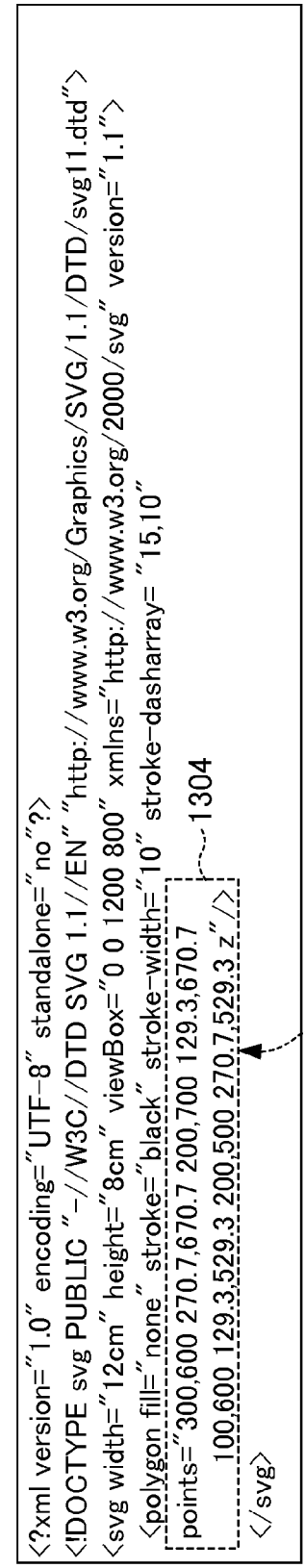
Figure 13C:
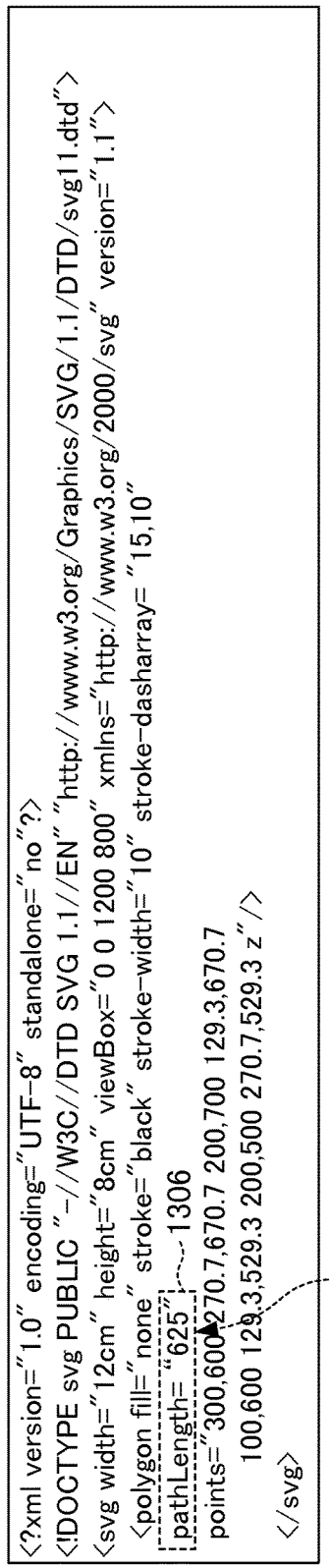

FIG. 13C illustrates an example in which the "pathLength" attribute, which is defined in the SVG format as the path length information, is added to the SVG data after path thinning processing (the path correction processing 1), which will be described below with reference to FIG. 6, has been performed as the path correction processing.

FIG. 5 is a flowchart illustrating the check processing to check whether the path length information is necessary or not, which is called in S404 shown in FIG. 4.

Firstly, when the processing of the data conversion unit 225 is loaded and executed by the CPU 121, in S501, the CPU 121 determines whether or not path length information exists in the drawing data. If the path length information exists, the processing proceeds to S505, and if the path length information does not exist, the processing proceeds to S502. In the case of the SVG format, whether or not the path length information exists is determined by whether the "pathLength" attribute is included or not.

In S502, the CPU 121 determines whether or not a dash pattern is specified in the drawing data. If it is specified, the processing proceeds to S506, and if it is not specified, the processing proceeds to S503. In the case of the SVG format, whether or not the dash pattern is specified is determined by whether the "stroke-dasharray" attribute is included or not. In S503, the CPU 121 determines whether or not a character string drawing along the path is specified in the drawing data. If it is specified, the processing proceeds to S506, and if it is not specified, the processing proceeds to S504. In the case of the SVG format, whether or not the character string drawing is specified is determined by whether the "textPath" element is included or not.

In S504, the CPU 121 determines whether or not a motion path is specified in the drawing data. If it is specified, the processing proceeds to S506, and if it is not specified, the processing proceeds to S505. In the case of the SVG format, it is determined whether or not the motion path that is specified by the "animateMotion" element is included. In S505, the CPU 121 determines that the path length information is not necessary and returns to the calling process. In contrast, in S506, the CPU 121 determines that the path length information is necessary and returns to the calling process.

Figure 6:
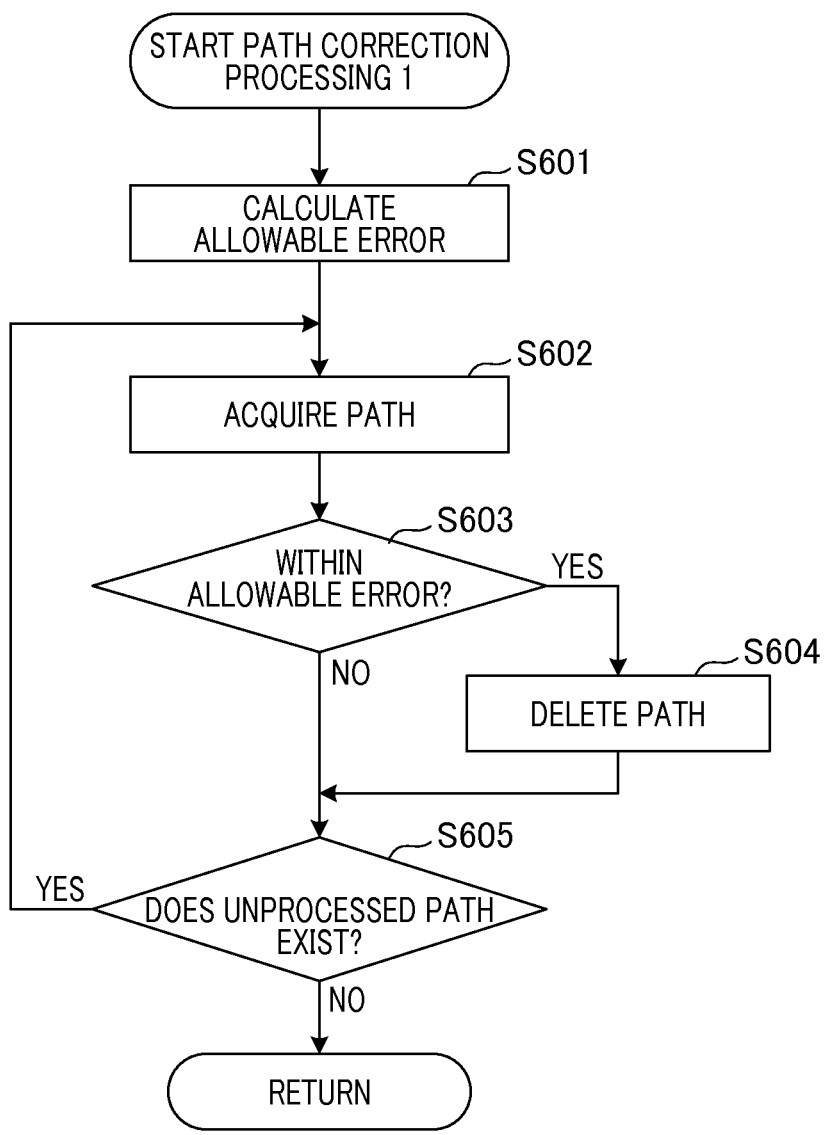
FIG. 6 is a flowchart illustrating path correction processing 1.

FIG. 6 is a flowchart illustrating the path correction processing 1, which is one of the path correction processes called in S407 shown in FIG. 4.

The path correction processing 1 is a processing that thins out the path by deleting the path for which it has been determined that, when the path in the drawing data is thinned out, the figure shape is within an allowable error specified for the path before thinning out. Firstly, when the processing of the data conversion unit 225 is loaded and executed by the CPU 121, in S601, the CPU 121 calculates the allowable error during the figure drawing. The allowable error may be fixed beforehand, or may be a suitable value determined based on a size or a resolution information of the display terminal.

In S602, the CPU 121 acquires path information for 3 points from the drawing data. Next, in S603, when the acquired 3 points are denoted as a first point, a second point, and a third point in an appearing order, the CPU 121 calculates the distance of the straight line connecting the second point, which is the middle point, and the first and the second points, which are the both ends. Then the CPU 121 determines whether or not the distance is within the allowable error calculated in S601. In the determination in S603, if the distance is within the allowable error, the processing proceeds to S604, and if the distance is not within the allowable error, the processing proceeds to S605. In S604, the CPU 121 deletes the path of the middle point from the drawing data and the processing proceeds to S605.

FIGS. 9A and 9B, and FIGS. 11A and 11B illustrate examples of the paths before the path correction processing 1 (thinning out processing) is performed and the paths after the path correction processing 1 is performed.

Figure 11B:
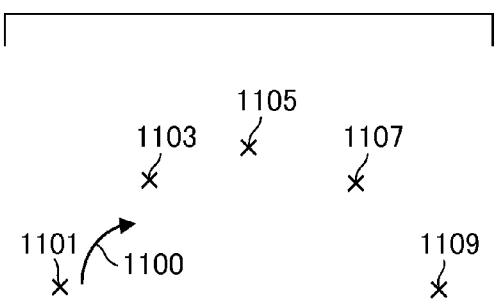

FIG. 9B illustrates a state where 8 points, which are a point 902, a point 904, a point 906, a point 908, a point 910, a point 912, a point 914, and a point 916, are thinned out from FIG. 9A. Furthermore, FIG. 11B illustrates a state where 4 points, which are a point 1102, a point 1104, a point 1106, and a point 1108, are thinned out from FIG. 11A.

Returning to the flowchart shown in FIG. 6, in S605, the CPU 121 determines whether or not an unprocessed path exists in the drawing data. If an unprocessed path exists, the processing returns to S602, and if an unprocessed path does not exist, the processing returns to the calling process.

Figure 7:
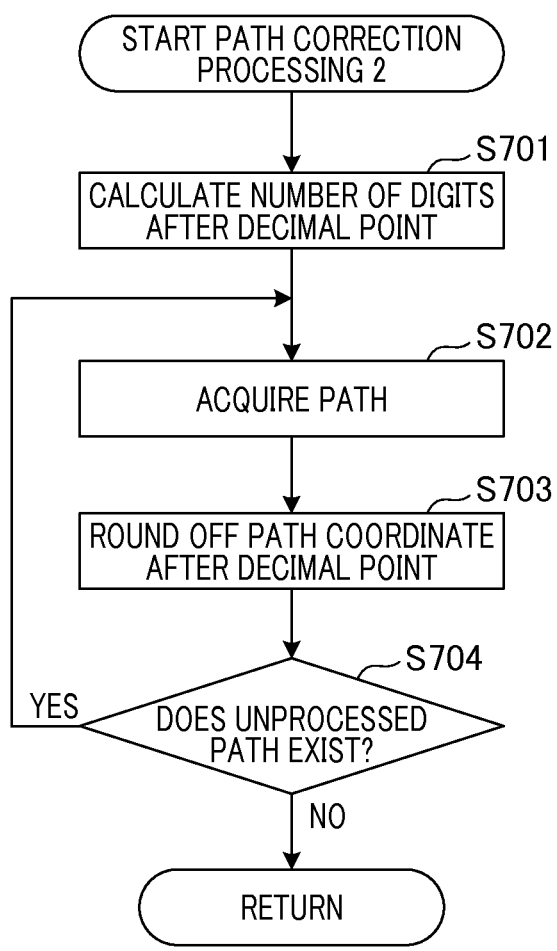
FIG. 7 is a flowchart illustrating path correction processing 2.

FIG. 7 is a flowchart illustrating the path correction processing 2, which is one of the path correction processing called in S407 shown in FIG. 4.

The path correction processing 2 is a processing to perform the path correction for reducing a size of a coordinate description, when there is a description after the decimal point in a coordinate description of the path, by rounding off to predetermined number of digits after the decimal point.

Firstly, when the processing of the data conversion unit 225 is loaded and executed by the CPU 121, in S701, the CPU 121 calculates the allowable number of digits after the decimal point for the path in the drawing data. The number of digits may be fixed beforehand, or may be a suitable value determined based on a size or a resolution information of the display terminal. In S702, the CPU 121 sequentially acquires path information from the drawing data. Next, in S703, when there is a value after the decimal point in the coordinate of acquired path, the CPU 121 rounds the coordinate value of the path off to the allowable number of digits calculated in S701. Next, in S704, the CPU 121 determines whether or not an unprocessed path exists in the drawing data. If an unprocessed path exists, the processing returns to S702, and if an unprocessed path does not exist, the processing returns to the calling process.

Figure 8:
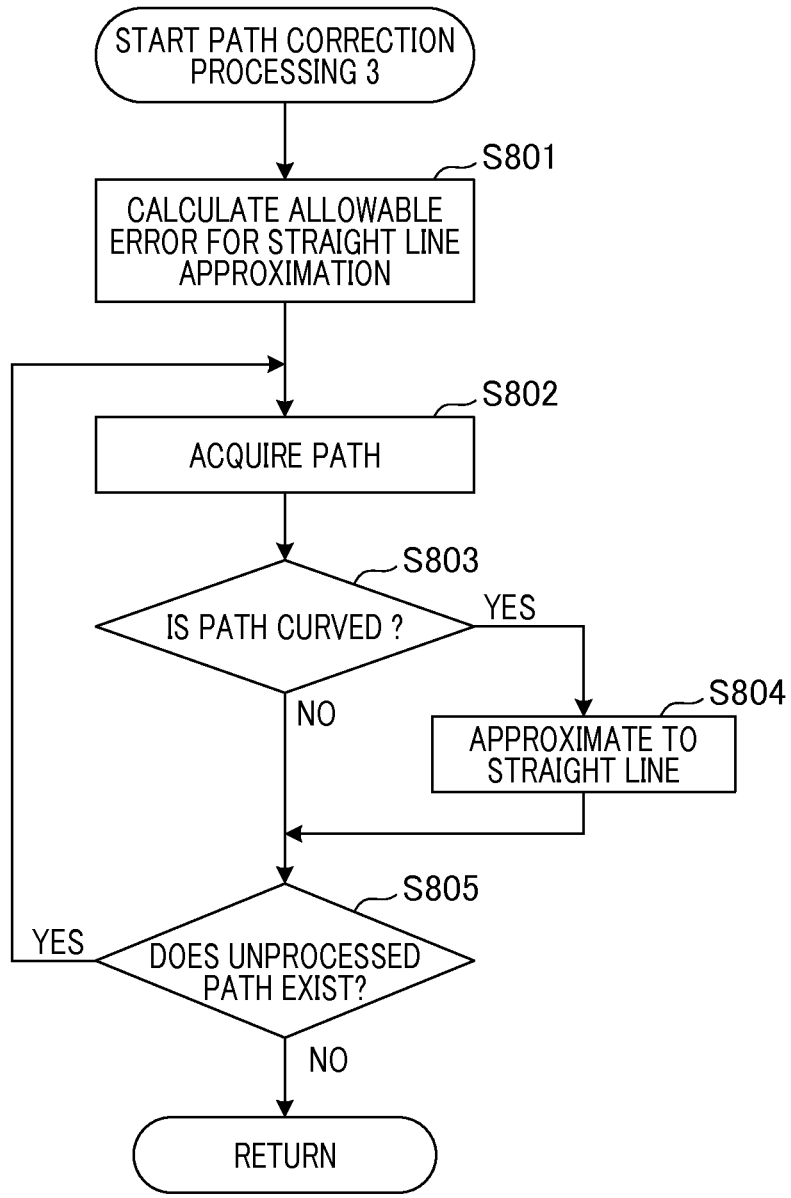
FIG. 8 is a flowchart illustrating path correction processing 3.

FIG. 8 is a flowchart illustrating the path correction processing 3, which is one of the path correction processing called in S407 shown in FIG. 4.

The path correction processing 3 is a processing to approximate a curve path in the drawing data to a straight line path and thereby replaces heavy load processing with light load processing beforehand.

Firstly, when the processing of the data conversion unit 225 is loaded and executed by the CPU 121, in S801, the CPU 121 calculates an allowable error for approximating a curve to straight line. Next, in S802, the CPU 121 sequentially acquires the path information from the drawing data. Next, in S803, the CPU 121 determines whether or not the acquired path is a curved path. In the determination in S803, if it is a curved path, the processing proceeds to S804, and if it is not a curved path, the processing proceeds to S805. In S804, the CPU 121 approximates the curved path into a straight line such that the approximation is within the approximate error of the straight line calculated in S801, and replaces the curved path with the straight line path. In S805, the CPU 121 determines whether or not an unprocessed path exists in the drawing data. If an unprocessed path exists, the processing returns to S802, and if an unprocessed path does not exist, the processing returns to the calling process.

As described above, the data amount of the path in the drawing data can be reduced by the path correction processing 1 to 3. Next, a description will be given of a scale adjustment of the drawing data according to the reduction amount produced by the reduction of the path correction processing, for suppressing a deterioration in drawing quality, where these path correction processings cause a deterioration in drawing quality such as a deviation when drawing a character string along the path, a deviation of a stroke dash position, or the like.

FIGS. 10A to 10C are diagrams illustrating the path before thinning out and the path after thinning out of the paths shown in FIGS. 9A and 9B, which are drawn in a dash pattern (a broken line).

A dash pattern drawing is a line drawing in which the "stroke-dasharray" attribute is specified. FIG. 10A is a diagram in which the dash pattern drawing is performed on the path shown in FIG. 9A. FIG. 10B is a diagram in which the dash pattern drawing is performed on the path shown in FIG. 9B. A round frame 1002 indicates the part that connects the start point and the end point of the line drawing and a line 1003 shows the expanded part of the round frame 1002. Furthermore, a round frame 1005 indicates the part that connects the start point and the end point of the line drawing, and a line 1006 shows the expanded part of the round frame 1005. Comparing the line 1003 and the line 1006, the result of the dash pattern drawing of the part that connects the start point and the end point differs, and in the line 1003, it is blank, whereas in the line 1006, it is black. Since the length of the path changes by thinning out the path in the path correction processing 1, the result of the drawing varies as described above.

According to the present embodiment, as shown in FIG. 4, by adding the path length information (S408) after the path correction processing (S407), the dash pattern drawing performed on the path shown in FIG. 9B will be FIG. 10C. In a line 1009 shown in FIG. 10C, the part that connects the start point and the end point of the line drawing is blank, which is same as the line 1003 shown in FIG. 10A. This is because, by adding the "pathLength", which is the path length information, any application that performs the drawing of the SVG data scales the path by a ratio of the pathLength to a total length of the path that the application itself has calculated, and draws the path. Here, since the path length before the path correction processing is specified as the "pathLength", even if the path length is changed due to the path correction processing, it is automatically scaled when the application draws the path. In other words, with respect to the path after the path correction processing is corrected so as to be drawn by the path length before the path correction, deviation does not occur with the value of the dash pattern specified separately. Therefore, equivalent drawing results can be obtained before and after the path correction processing.

FIGS. 13A to 13C are diagrams illustrating data describing the drawings of FIG. 10A to FIG. 10C in the SVG format.

FIG. 13A illustrates SVG data before the path correction processing 1, in other words, before thinning out the path. In data enclosed by a frame 1302, information for a path including 17 points shown in FIG. 9A is described after "points=" by a combination of an x coordinate and a y coordinate. The description indicates that the start point is "300, 600", and points "292.4, 638.3", "270.7, 670.7" follow, and the last "z" is connected to the start point (in this example, it is 300, 600), and therefore it is a closed figure. FIG. 13B illustrates SVG data after the path correction processing 1, in other words, after thinning out the path. Data enclosed by a frame 1304 is information of the path shown in FIG. 9B. The information indicates that after the description of "points=", the start point is "300, 600", and points "270.7, 670.7", "200, 700" follow, and the last is "z", in other words, it is connected to the start point, and overall there are 9 points. Accordingly, it can be seen that the path has being thinned out. FIG. 13C illustrates SVG data to which the path length information has been added after the path correction processing 1 so as to become as shown in FIG. 10C. In FIG. 13C, "pathLength=625" enclosed by a frame 1306 is added to FIG. 13B as the path length information.

Figure 12A:
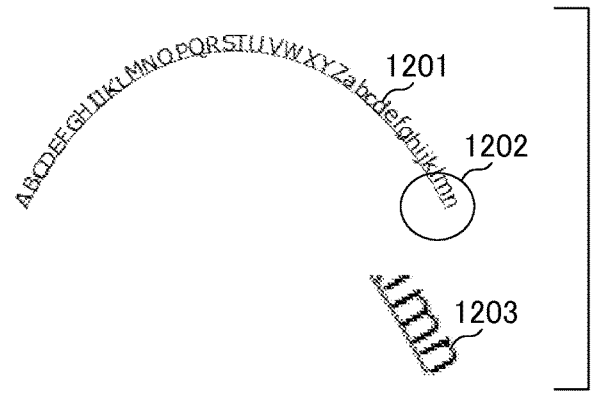
FIGS. 12A to 12C are diagrams illustrating a character string along a path before thinning out and the path after thinning out.
Figure 12B:
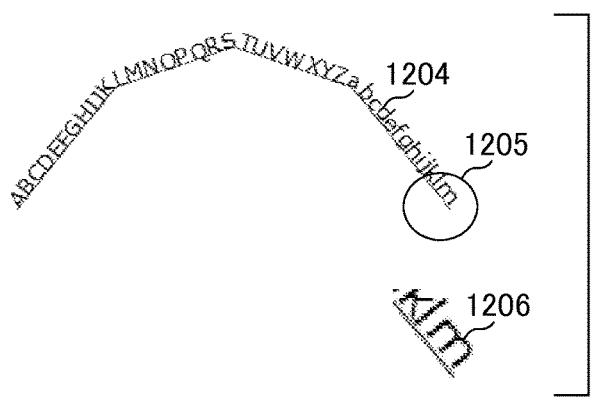
Figure 12C:
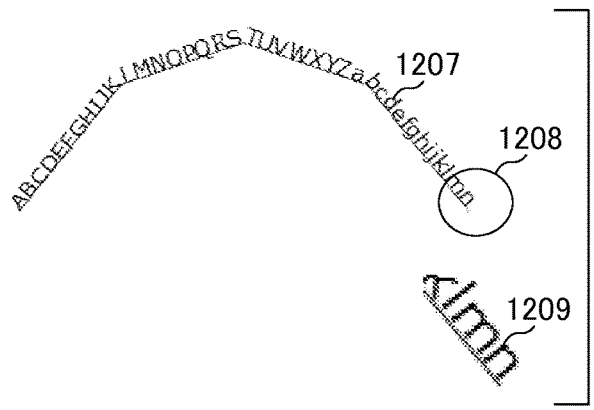

FIGS. 12A to 12C are diagrams illustrating line drawings of paths shown in FIGS. 11A and 11B, which are paths before being thinned out and after being thinned out, and furthermore, drawing character strings along the paths.

FIG. 12A illustrates a line drawing of the path shown in FIG. 11A and drawing a character string along the path. FIG. 12B illustrates a line drawing of the path shown in FIG. 11B and drawing a character string along the path. A round frame 1202 indicates the part of the end point of the drawing and a character 1203 is the expanded part of the round frame 1202. Furthermore, a round frame 1205 indicates the part of the end point of the drawing and a character 1206 that is the expanded part of the round frame 1205. Comparing the character 1203 and the character 1206, the last character of the character string differs, and in the character 1203, it is "n", whereas in the character 1206, it is "m". Since the length of the path changes by thinning out the path in the path correction processing 1, the result of the drawing varies as described above. According to the present embodiment, as shown in FIG. 4, by adding the path length information (S408) after the path correction processing (S407), the result of the drawing of the character string along the path shown in FIG. 11B will be FIG. 12C. As a character 1209 shown in FIG. 12C, the last character of the part of the end point of the drawing is "n", which is same as the character 1203 shown in FIG. 12A. This is because, by adding the "pathLength", which is the path length information, any application that performs the drawing of the SVG data corrects the drawing of the path after the path correction processing by the path length before the path correction. The path length is drawn after being scaled, and thus, even if a character string is arranged along the path, drawing results equivalent to those before the path correction processing can be obtained.

Figure 14:
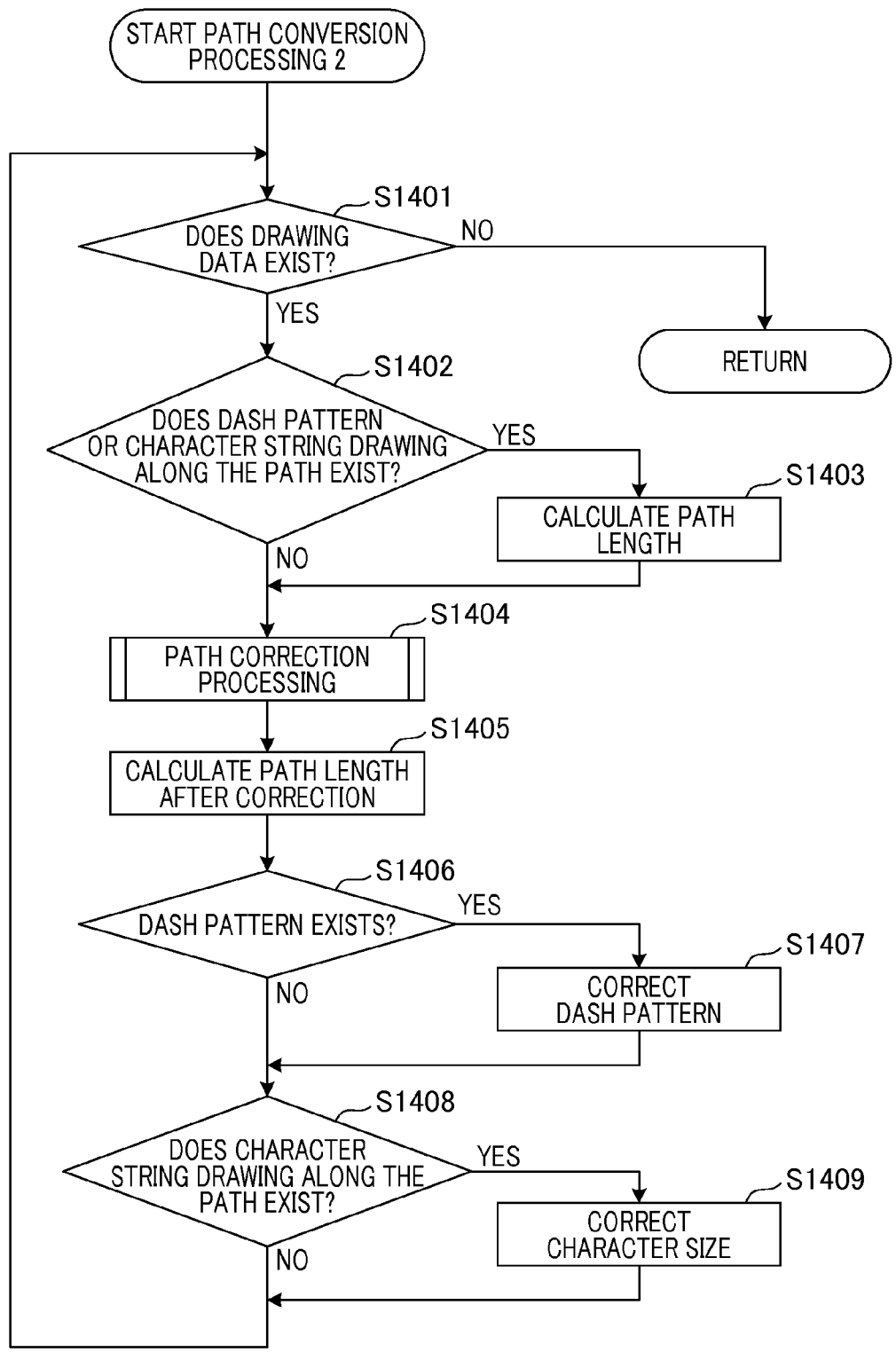
FIG. 14 is a flowchart illustrating a path conversion processing 2.

FIG. 14 is a flowchart illustrating the path correction processing 2 called in S305 shown in FIG. 3.

The processing shown in FIG. 14 is performed when there is no definition for the path length in the format specified for the data conversion processing. Note that even if there is a definition for a path length such as the SVG format, the processing shown in FIG. 14 may be performed rather than using the path length definition. Here, for an example of drawing data to which the processing shown in FIG. 14 has been applied, the SVG format data is shown in FIG. 15.

Firstly, when the processing of the data conversion unit 225 is loaded and executed by the CPU 121, in S1401, the CPU 121 determines whether or not unprocessed drawing data exists. If unprocessed drawing data exists, the processing proceeds to S1404, and if unprocessed drawing data does not exist, the processing returns to the calling process. In S1402, the CPU 121 searches the drawing data and determines whether or not a specification for a dash pattern or a specification for drawing a character string exists along the path. If a specification for a dash pattern or a specification for drawing a character string exists along the path, the processing proceeds to S1403, and if a specification for a dash pattern or a specification for drawing a character string does not exist along the path, the processing proceeds to S1404.

In S1403, the CPU 121 acquires the path information of the drawing data and calculates the path length. Assume that the path length calculated here is "A". The method for calculating the path length is the same as the one mentioned above in S406. Next, in S1404, the path correction processing 1 to 3 shown in FIGS. 6 to 8 is performed. Which one of the correction processing is performed among the path correction processing 1 to 3 can be performed by the predetermined correction processing or can be combined with a plurality of the correction processing. Next, in S1405, the CPU 121 calculates the path length after the path correction processing. Assume that the path length after the correction calculated here is "B".

Next, in S1406, the CPU 121 determines whether or not a specification of dash pattern exists in the drawing data. If it exists, the processing proceeds to S1407 and if it does not exist, the processing proceeds to S1408. In S1407, a specification value (drawing parameter) for a dash pattern in the drawing data is corrected by using the path length "A", which is calculated in S1403 and the path length after the correction "B", which is calculated in S1405. Here, the specification value for dash pattern is a value for specifying in "stroke-dasharray" attribute, and is a value for specifying a length of a solid line and a blank for drawing a dash pattern. Assume that an original specification value of the dash pattern attribute is "C", and a specification value of the dash pattern attribute after the correction is "D". Then "D" can be calculated as the following.

$$D=(B/A)*C$$

In other words, a dash pattern having the length of the solid line and the blank of the original dash pattern respectively multiplied by B/A is drawn. When there are a plurality of specification values of a dash pattern, the aforementioned calculations are performed on each of the values.

As described above, by correcting the specification value of the dash pattern, equivalent drawing results of the dash pattern between the dash pattern before thinning out the path shown in FIG. 10A and the dash pattern after thinning out the path can be obtained. In this way, even if the specification value of the dash pattern is directly corrected, a result equivalent to the case in which the path length information is added in S408, which is shown in FIG. 4, can be obtained.

FIG. 15 is a diagram illustrating an example of data upon correcting the specification value of the dash pattern by a method shown in S1407 of FIG. 14.

More specifically, FIG. 15 illustrates data, on which the correction of the specification value of the dash pattern of the data after thinning out the path as shown in FIG. 13B, is performed on the data described in the SVG format shown in FIG. 13A. Since the path length after thinning out the path is "B=612.247" while the path length before thinning out the path is "A=624.748", ratio is "(B/A)=0.98". The "stroke-dasharray" attribute is, as described above, an attribute for drawing a broken line and is for specifying lengths of the solid line and the intervals by describing them with a comma or a space separated. Here, the original specification value of the dash pattern "storke-dasharray=15, 10" is multiplied by 0.98 and becomes "stroke-dasharray=14.7, 9.8", as shown in a frame 1502 in FIG. 15. Accordingly, since the lengths of the solid line and the interval are both scaled and the change of the path length by the thinning out processing is corrected, the appearance of the dash pattern can be a result that is equivalent to the appearance before thinning out.

Returning to the flowchart shown in FIG. 14, in S1408, the CPU 121 determines whether or not there is a character string drawing along the path. If there is a character string drawing along the path, the processing proceeds to S1409, and if there is no character string drawing along the path, the processing returns to S1401. In S1409, a specification value of a character size of the drawing data is corrected by using the path length "A", which is calculated in S1403, and the path length after the correction "B", which is calculated in S1405, and the processing returns to S1401. Assume that an original character size is "E" and a character size after the correction is "F". Then the correction of the character size is calculated by the following:

$$F=(B/A)*E$$

In other words, a character is drawn by the size calculated by multiplying the original character size by B/A. When there is a plurality of specification values of a character size, the aforementioned calculations are performed on each of the values.

As described above, when there is a character string drawing along the path, by correcting the size of the character, equivalent drawing results of the character string along the path between the character string before thinning out the path shown in FIG. 12A and the character string along the path after thinning out the path can be obtained. In this way, even if the specification value of the character size is directly corrected, a result equivalent to the case in which the path length information is added in S408 shown in FIG. 4 can be obtained.

Note that in the present embodiment, the specification value of the character string is corrected in S1408, but the way of correcting the character string drawing is not limited to this. For example, a vertical size or a horizontal size of a character, such as a pitch of a character or the like, may be respectively corrected.

As described above, according to the present embodiment, while reducing the data amount by performing path correction processing such as thinning out the path of the drawing data or the like, the drawing quality can be maintained by performing the path correction processing based on the path length information according to the reduction amount. Accordingly, while shortening data communication time or speeding up display time, a deterioration in drawing quality can be suppressed.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-210160, filed Oct. 14, 2014, which is hereby incorporated by reference wherein in its entirety.

What is claimed is:

1. An information processing apparatus comprising:
a memory for storing a computer program; and
a processor for executing the computer program to perform:
    calculating a length of a first path included in first drawing data;
    converting the first drawing data including the first path into second drawing data including a second path by correcting the first path into the second path, wherein a data amount of the second path becomes less than a data amount of the first path;
    adding information corresponding to the calculated length of the first path to the second path included in the second drawing data; and
    transmitting the second drawing data including the second path to which the information has been added,
    wherein, when the second path included in the transmitted second drawing data is drawn, the added information is used to adjust a scale of the drawn second path so that a length of the drawn second path corresponds to the calculated length of the first path.

2. The information processing apparatus according to claim 1, wherein the processor further determines whether or not to correct the first path based on a number of coordinate points included in the first path.

3. The information processing apparatus according to claim 1, wherein the second path is obtained by thinning out coordinate points included in the first path.

4. The information processing apparatus according to claim 3, wherein the processor acquires three coordinate points included in the first path, and when the three coordinate points are denoted as a first point, a second point, and a third point in an order of appearance, if a distance between the second point and a straight line connecting the first point and the third point is smaller than a predetermined value, the processor thins out the second point.

5. The information processing apparatus according to claim 1, wherein, if coordinate points included in the first path include a value after a decimal point, the second path is obtained by rounding off the value after the decimal point to a predetermined number of digits.

6. The information processing apparatus according to claim 1, wherein, if a curve is included in the first path, the second path is obtained by approximating the curve to a straight line.

7. The information processing apparatus according to claim 1, wherein, if the second path is described in a Scalable Vector Graphics (SVG) format, the information corresponding to the calculated length of the first path is added as a "pathLength" attribute defined in the SVG format.

8. An information processing apparatus comprising:
a memory for storing a computer program; and
a processor for executing the computer program to perform:
    calculating a length of a first path included in first drawing data;
    converting the first drawing data including the first path into second drawing data including a second path by correcting the first path into the second path, wherein a data amount of the second path becomes less than a data amount of the first path;
    correcting a drawing parameter of a drawing along the second path, wherein, when the length of the first path is denoted as A, and the length of the second path is denoted as B, the corrected drawing parameter of the drawing along the second path is obtained by multiplying the drawing parameter of the drawing by B/A; and
    transmitting the second drawing data including the second path and the corrected drawing parameter of the drawing along the second path,
    wherein the corrected drawing parameter is used when the drawing along the second path is drawn.

9. The information processing apparatus according to claim 8, wherein, if the drawing along the second path is a dash pattern, the corrected drawing parameter of the dash pattern is obtained by multiplying the drawing parameter of the dash pattern by B/A.

10. The information processing apparatus according to claim 8, wherein, if the drawing along the second path is an arrangement of a character string, the corrected drawing parameter of the character string is obtained by multiplying a size parameter of the character string by B/A.

11. The information processing apparatus according to claim 1, wherein the processor executes the computer program to perform:
    transmitting the second drawing data including the second path to which the added information has been added to a terminal,
    wherein, in the terminal, the added information is used to adjust the scale of the drawn second path so that a length of the drawn second path corresponds to the calculated length of the first path when the terminal draws the second path included in the transmitted second drawing data.

12. A method for controlling an information processing apparatus, the method comprising:
    calculating a length of a first path included in first drawing data;
    converting the first drawing data including the first path into a second drawing data including a second path by correcting the first path into the second path, wherein a data amount of the second path becomes less than a data amount of the first path;
    adding information corresponding to the calculated length of the first path to the second path included in the second drawing data; and
    transmitting the second drawing data including the second path to which the information has been added,
    wherein, when the second path included in the transmitted second drawing data is drawn, the added information is used to adjust a scale of the drawn second path so that a length of the drawn second path corresponds to the calculated length of the first path.

13. A non-transitory computer-readable storage medium storing a computer program for making a computer perform:
calculating a length of a first path included in first drawing data;
converting the first drawing data including the first path into second drawing data including a second path by correcting the first path into the second path, wherein a data amount of the second path becomes less than a data amount of the first path;
adding information corresponding to the calculated length of the first path to the second path; and
transmitting the second drawing data including the second path to which the information has been added,
wherein, when the second path included in the transmitted second drawing data is drawn, the added information is used to adjust a scale of the drawn second path so that a length of the drawn second path corresponds to the calculated length of the first path.

14. A method for controlling an information processing apparatus, the method comprising:
calculating a length of a first path included in first drawing data;
converting the first drawing data including the first path into second drawing data including a second path by correcting the first path into the second path, wherein a data amount of the second path becomes less than a data amount of the first path;
correcting a drawing parameter of a drawing along the second path, wherein, when the length of the first path is denoted as A, and the length of the second path is denoted as B, the corrected drawing parameter of the drawing along the second path is obtained by multiplying the drawing parameter of the drawing by B/A; and
transmitting the second drawing data including the second path and the corrected drawing parameter of the drawing along the second path,
wherein the corrected drawing parameter is used when the drawing along the second path is drawn.

15. A non-transitory computer-readable storage medium storing a computer program for making a computer perform:
calculating a length of a first path included in first drawing data;
converting the first drawing data including the first path into second drawing data including a second path by correcting the first path into the second path, wherein a data amount of the second path becomes less than a data amount of the first path;
correcting a drawing parameter of a drawing along the second path, wherein, when the length of the first path is denoted as A, and the length of the second path is denoted as B, the corrected drawing parameter of the drawing along the second path is obtained by multiplying the drawing parameter of the drawing by B/A; and
transmitting the second drawing data including the second path and the corrected drawing parameter of the drawing along the second path,
wherein the corrected drawing parameter is used when the drawing along the second path is drawn.

* * * * *